US008743689B2

(12) United States Patent
Stephens

(10) Patent No.: US 8,743,689 B2
(45) Date of Patent: Jun. 3, 2014

(54) METHOD AND APPARATUS FOR SMS TERMINATION OVERLOAD PROTECTION

(75) Inventor: Gary Boyd Stephens, Richardson, TX (US)

(73) Assignee: Apple Inc., Cupertino, CA (US)

(*) Notice: Subject to any disclaimer, the term of this patent is extended or adjusted under 35 U.S.C. 154(b) by 117 days.

(21) Appl. No.: 13/147,986

(22) PCT Filed: Feb. 9, 2010

(86) PCT No.: PCT/US2010/023632
§ 371 (c)(1),
(2), (4) Date: Aug. 4, 2011

(87) PCT Pub. No.: WO2010/091407
PCT Pub. Date: Aug. 12, 2010

(65) Prior Publication Data
US 2011/0292808 A1    Dec. 1, 2011

Related U.S. Application Data

(60) Provisional application No. 61/151,026, filed on Feb. 9, 2009.

(51) Int. Cl.
*H04L 12/26* (2006.01)
(52) U.S. Cl.
USPC .................. 370/235; 455/412.1; 455/466
(58) Field of Classification Search
None
See application file for complete search history.

(56) References Cited

U.S. PATENT DOCUMENTS

| 5,878,351 | A  | * | 3/1999  | Alanara et al. | 455/466 |
| 6,606,502 | B1 | * | 8/2003  | Chung Kam Chung et al. | 455/466 |
| 6,996,225 | B1 |   | 2/2006  | Bordonaro | |
| 7,436,769 | B2 | * | 10/2008 | Loader et al. | 370/235 |
| 7,486,621 | B2 | * | 2/2009  | Bessis et al. | 370/236 |
| 7,548,756 | B2 | * | 6/2009  | Velthuis et al. | 455/466 |
| 2001/0041579 | A1 | * | 11/2001 | Smith et al. | 455/466 |
| 2002/0159387 | A1 | * | 10/2002 | Allison et al. | 370/229 |

(Continued)

FOREIGN PATENT DOCUMENTS

GB    2386793    9/2003

OTHER PUBLICATIONS

Short Message Peer to Peer Protocol Specification v5.0 Feb. 19, 2003.*

(Continued)

*Primary Examiner* — Brian Roberts
(74) *Attorney, Agent, or Firm* — Meyertons, Hood, Kivlin, Kowert & Goetzel, P.C.

(57) ABSTRACT

In order to ameliorate the overload at an overloaded network node that is discarding some of the SMSs it is receiving, when a node is overloaded with received SMSs, it sends a message to the nodes from which it is receiving SMSs of that fact and includes a parameter indicating the extent to which it is overloaded. That parameter, for instance, may be the percentage of SMSs that it is receiving that are being discarded. With this information, the sending node can determine a percentage of the pending SMSs during such conditions that will help remove the overloaded node from the overload condition more quickly. Furthermore, the network protocol may be adapted to include a priority parameter in SMSs. Then, when an SMS sending node knows that a node to which it is sending SMSs is overloaded, the sending node may decide which SMSs to send to the overloaded node based on such priority information.

17 Claims, 4 Drawing Sheets

(56) References Cited

U.S. PATENT DOCUMENTS

| | | |
|---|---|---|
| 2002/0196785 A1* | 12/2002 | Connor .................. 370/392 |
| 2004/0048629 A1* | 3/2004 | Yoon ..................... 455/466 |
| 2004/0219908 A1 | 11/2004 | Ganor |
| 2006/0068761 A1* | 3/2006 | Chambers et al. ...... 455/412.1 |
| 2007/0191035 A1* | 8/2007 | Huggett .................. 455/466 |
| 2009/0233630 A1* | 9/2009 | Wilson ................... 455/466 |

OTHER PUBLICATIONS

International Search Report and Written Opinion issued for PCT/US2010/023632, issued May 11, 2010.

Gateway control protocol: Media gateway resource congestion handling package; H.248.10, Jul. 2001; ITU-T Standard in Force (I), International Telecommunication Union, Geneva.

* cited by examiner ial application No. 60/151,026 filed on Feb. 9, 2009, which is fully incorporated herein by reference.

METHOD AND APPARATUS FOR SMS TERMINATION OVERLOAD PROTECTION

CROSS REFERENCE TO RELATED APPLICATIONS

This application is the U.S. national phase of PCT/US2010/023632, filed Feb. 9, 2010, which claims priority to U.S. provisional application No. 60/151,026 filed on Feb. 9, 2009, which is fully incorporated herein by reference.

FIELD OF THE INVENTION

The invention pertains to the exchange of SMS messages between the nodes of a network.

BACKGROUND OF THE INVENTION

The short message service ("SMS") provided by many cellular telephone companies is a service that permits the cellular customers to compose short text messages that can be transmitted via the network from the sender's cell phone to another cell phone and viewed on the other cell phone. In more recent years, these messages (commonly called SMSs themselves) can also contain other types of media, including audio clips and video clips. SMSs differ from conventional telephone calls because they are not a real time, two-way communication between the owners of the two cell phones. An SMS is more akin to an email in the sense that it is a one way communication from the sender to the receiver.

Due to this difference, communication networks tend to handle SMSs differently than voice calls in some respects. For instance, when one of the nodes involved in a conventional voice call between two cell phones is too overloaded to service all of the voice calls being made through that node at a given time, the overloaded node discards some of the voice calls. It is then up to each individual calling party whose call failed to try to make its call again.

On the other hand, since SMSs are not real-time two-way communications, when an SMS is discarded at a node, the node that sent the SMS typically continues to try to send the SMS repeatedly until it is successfully received by the target cellular telephone (or other device). Every network operates according to its specific design parameters. However, as an example, in the ANSI-41 protocol, the SMS sending node (i.e., a Short Message Service Center or SMSC) sends a Short Message Service Point to Point invoke message (hereinafter SMSDPP) containing the SMS to the SMS receiving node (i.e., a Mobile Switching Center or MSC) and typically waits to receive an acknowledgement message (i.e., a Short Message Service Point to Point return result or smsdpp return result) from the receiving node. If it does not receive the acknowledgment within a relatively short period of time, e.g., less than a minute (or if it receives a delivery failure notification; which is the protocol in certain networks), the sending node will assume the SMS did not reach its destination and send the SMS again. Typically, the sending node may try to send the SMS ten or more times in relatively quick succession before giving up.

Thus, this practice of resending an unacknowledged SMS to an overloaded node actually can exacerbate the overload condition at that node because every discarded message may cause the sending node to repeatedly send the same message over and over again in a reasonably short window, thus adding even more traffic to the overloaded node.

Furthermore, SMS messages do not contain any data as to priority of one SMS message relative to another or even whether the SMS is itself an acknowledgement message. Accordingly, an overloaded node that is discarding some portion of the SMSs it is receiving is discarding some of the SMSs and delivering others of the SMSs without any knowledge as to the importance of any of the SMSs.

SUMMARY OF THE INVENTION

In order to ameliorate the overload at an overloaded network node that is discarding some of the SMSs it is receiving, when a node is overloaded with received SMSs, it sends a message to the nodes from which it is receiving SMSs of that fact and includes a parameter indicating the extent to which it is overloaded. That parameter, for instance, may be the percentage of SMSs that it is receiving that are being discarded. With this information, the sending node can determine a percentage of the pending SMSs during such conditions that will help remove the overloaded node from the overload condition more quickly. Furthermore, the network protocol may be adapted to include a priority parameter in SMSs. The SMS receiving node can then make a more informed decision as to which SMSs to discard and which to deliver based on the priority parameter. Even further, when an SMS sending node knows that a node to which it is sending SMSs is overloaded, the sending node itself may decide which SMSs to send to the overloaded node based on such priority information.

DETAILED DESCRIPTION OF THE EMBODIMENTS

The present invention will now be described in connection with an exemplary embodiment for a cellular telephone network having SMS and implementing the ANSI-41 standard. ANSI-41, also known as IS-41, is a mobile, cellular telecommunication system standard to support mobility management that facilitates inter-switch operations, such as handoffs and roaming authentications. However, it should be noted that ANSI-41 is merely exemplary and that the present invention is broadly applicable to many other types of network mobility management schemes, to networks other than wireless cellular telephone networks, and to messages other than SMSs.

Figure 1:
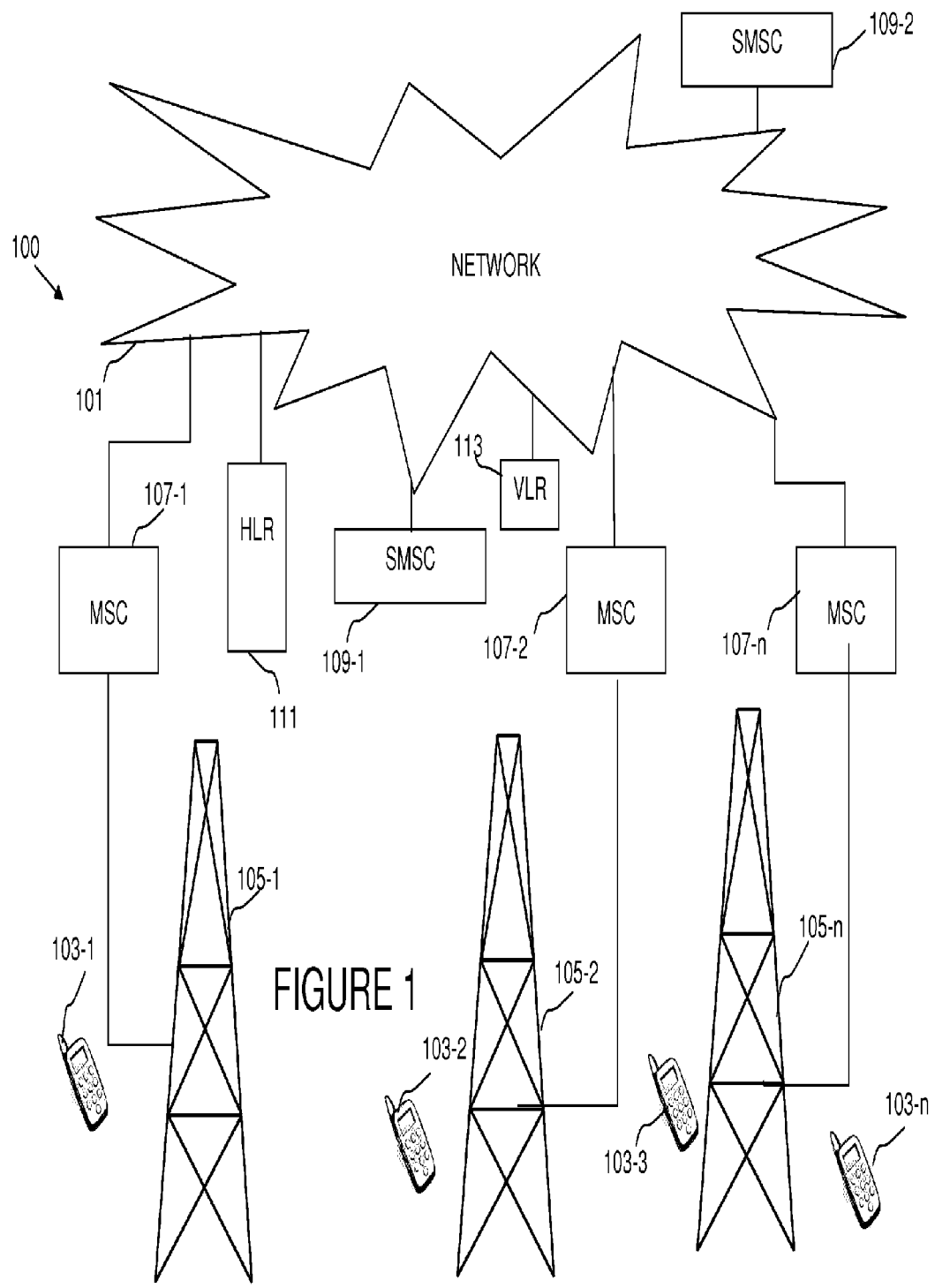
FIG. 1 is a diagram of a cellular telephone network in which aspects of the present invention are implemented.

FIG. 1 is a diagram illustrating a typical wireless network, such as a cellular telephone network. It should be noted that the diagram shows separately only portions of the network significant to the discussion. The remainder of the network components is represented generically by network cloud 101 The network 100 supports communication between the wireless communication units of its subscribers 103-1, 103-2, 103-3, . . . , 103-n (collectively 103), such as cellular telephones, wireless PDAs, etc. These wireless communication units interface with the network through a plurality of base stations 105-1, 105-2, . . . , 105-n (collectively 105). The base stations 105 further interface with the network cloud 101 through mobile switching centers (MSCs) 107-1, 107-2, ..., 107-n (collectively 107). Typically, one or more base stations 105 are serviced by a single MSC 107. In the exemplary illustrated network 100, there is one MSC 107 per base station 105. When an SMS is being sent to a mobile communication unit 103, such as mobile communication unit 103-1, the MSC 107 through which that message is transmitted to the mobile communication unit is termed the serving MSC or MSC-S. Thus, the serving MCS 107 for an SMS destined for mobile communication unit 103-1 is MSC 107-1.

SMSs in the network 100 are handled through a node dedicated to handling SMSs called the Short Message Service Center or SMSC 109-1. A network may include several SMSCs 109-1, 109-2 (collectively 109), each serving a different subset of subscribers of the network. Two SMSCs 109-1, 109-2 are illustrated in network 100. SMSCs 109-1 and 109-2 may communicate with each other to transfer SMSs between their respective portions of the network. An SMSC 109 receives SMSs destined for a particular wireless communication unit, determines the base station 105 serving the cell in which the destination wireless communication unit is located, identifies the MSC 107 servicing that area, and sends the SMS to that MSC for forwarding to the mobile unit through the appropriate base station.

Thus, as an example, let us consider an SMS sent from wireless communication unit 103-2 in the cell serviced by base station 105-2 to wireless communication unit 103-1 in the cell serviced by base station 105-1. Let us also assume that both wireless communication units 103-1 and 103-2 are serviced by the same SMSC 109-1. The SMS would be wirelessly transmitted from the wireless communication unit 103-2 to base station 105-2, which would forward it to its MSC 107-2. MSC 107-2 forwards it through the network cloud 101 to the SMSC 109-1. SMSC 109-1 processes the SMS and interrogates the Home Location Register (HLR) 111 to obtain routing information for wireless communication device 103-1 from the HLR 111, which, in this case, will indicate that wireless communication unit 103-1 is presently serviced by MSC 107-1. SMSC 109-1 forwards the SMS to the MSC 107-1 that services the base station corresponding to that cell. The MSC 107-1 retrieves the subscriber information for the destination mobile communication unit 103-1 from the Visitor Location Register (VLR) 113, which may include an authentication process. If the MSC 107-1 and base station 105-1 are operating normally, the Serving MSC 107-1 sends the SMS to base station 105-1, which then wirelessly transmits the SMS to the wireless communication unit 103-1. When mobile communication unit 103-1 receives the SMS, it will send an acknowledgement back to the base station 105-1, which the base station 105-1 forwards to its MSC 107-1. MSC 107-1 sends the acknowledgement to the SMSC 109-1. The SMSC 109-1 then knows that the message has been successfully transmitted to the destination mobile communication unit.

However, if the serving MSC 107-1 is overloaded, it will discard some of the SMSs it receives from the SMSC 109-1 (and any other SMSC 109 from which it is receiving SMSs). The overloaded Serving MSC does not maintain a copy of the SMS. When an MSC discards an SMS, some MSCs send a failure message to the sending SMSC and others do not send any message to the SMSC. Either way, the SMSC 109-1 will assume that the SMS was not properly delivered to the destination wireless communication unit 103-1. Accordingly, the SMSC 109-1 will store the SMS in a queue and try to resend it to mobile communication unit 103-1 in the same manner just described. It will repeat this process in relatively short intervals (e.g., every thirty seconds until it receives an acknowledgement or some predetermined maximum number of attempts is reached, e.g., ten). Some systems may not have a maximum and may continue trying to send the SMS ad infinitum.

Accordingly, it can be seen that conventional techniques for handling SMSs discarded at a serving MSC in a network can exacerbate the overloading of an already overloaded MSC.

In order to alleviate this problem, in accordance with the principles of the present invention, when an MSC is overloaded, it sends an indicator to the SMSC indicating that it is overloaded and reporting a metric indicative of the extent to which it is overloaded. For example, in a network operating in accordance with ANSI-41, the Serving MSC can include an overload parameter in the smsdpp (short message service delivery point to point) return result that the MSC 107-1 returns to the SMSC 109-1 in response to an SMSDPP.

The SMSC 109-1 receives the smsdpp return result from the serving MSC 107-1 and parses it to retrieve the overload parameter. The metric of the overload parameter can take several different forms. In one embodiment, for instance, the serving MSC calculates the percentage of the SMS traffic that it is discarding and sends that percentage as the overload parameter. The SMSC 109-1 retrieves the overload parameter from the smsdpp return result and, in response, adjusts the number of SMSs it is sending to that particular serving MSC 107-1 as a function of that percentage. Specifically, the SMSC 109-1 may determine the number of new (i.e., not previously sent) SMS events it processes and send (1—the overload parameter) percentage of them to the overloaded MSC 107-1. Thus, if the serving MSC 107-1 sends an smsdpp return result to the SMSC 109-1 with an overload parameter indicating that it is discarding 30% of all SMSs it is receiving, the SMSC 109-1 will thereafter send an amount equal to only 70% of the new SMSs it receives for that MSC 107-1 after receipt of the smsdpp return result containing the overload parameter of 30%.

In another embodiment, instead of reducing the load of SMSs sent to the overloaded SMS to (1—overload parameter) percent, the SMSC may store the previous load of SMSs it was sending to the overloaded MSC over a predetermined time period, x, preceding the receipt of the smsdpp return result containing an overload parameter indicating an overload condition and calculate a value, y:

$$y = \text{previous events} * (1 - \text{the overload parameter})$$

Thereafter, the SMSC sends no more than y SMSs per x seconds to that MSC until it receives a different smsdpp return result containing a different overload parameter. Even further, parameters other than the percentage of SMSs being discarded can be used also. For instance, the overloaded parameter could be a specific flow rate, i.e., a specific number of SMSs that the SMSC is permitted to send per time period. Other parameters also are possible.

If all of the SMSCs sending SMSs to that serving MSC operate in accordance with the present invention, then the serving MSC will quickly stop wasting resources on SMSs that are only going to be discarded. On the other hand, even if only some of the SMSCs sending SMSs to the serving MSC incorporate the invention, this particular scheme still provides a reasonably fair solution in terms of quality of service provided to both (a) the subscribers of the network with which the invention-enabled SMSC is associated and (b) the subscribers of the other network not incorporating the present invention. Particularly, SMSCs that do not incorporate the invention will continue to send all of their SMSs to the overloaded serving MSC, while SMSCs incorporating the present invention will be sending a lower percentage of their SMSs to the overloaded serving MSC. Thus, in theory, the SMSC that does not incorporate the present invention may be able to get more SMSs through the serving MSC without being discarded simply because it is sending more SMSs than the SMSC incorporating the present invention. However, the serving MSC may be configured so that, it is aware of which SMSCs in the network are enabled with the present invention and which are not. This can be done in any reasonable manner, such as preprogramming the MSCs with such information or as part of the initial handshake operations between two nodes. Then, when it is in overload and after it has sent a message to the invention-enabled SMSCs, it can assume that, thereafter, those SMSCs are sending a reduced load in accordance with the overload parameter that it sent to those SMSCs and not prejudice the SMSs received from those SMSCs any further. For instance, it can decide to deliver all of the SMSs it receives from invention-enabled SMSCs while discarding SMSs from only those SMSCs that that do not incorporate the present invention.

Other options to prevent prejudicing the subscribers sending SMSs through the invention-enabled SMSCs are also possible. For instance, the MSC may be configured to deliver approximately the same number of SMSs per SMSC from which it is receiving SMSs. If all SMSCs are sending approximately the same number of SMSs to the overloaded MSC, then the result will be that all of the SMSCs sending SMSs to the overloaded serving MSC will have approximately the same number of SMSs delivered successfully. The SMSCs incorporating the present invention that have reduced the percentage of SMSs sent to the overloaded MSC by the percentage overload of the overloaded MSC will be experiencing approximately a 100% success rate of SMSs reaching the destination mobile communication unit through the serving MSC, while the SMSCs that do not incorporate the present invention will continue to experience a (1—overload parameter) percentage success rate. In such a case, the overloaded MSC will come out of overload more slowly than if all the SMSCs sending SMSs to that MSC incorporated the present invention, but it will still exit the overload condition more quickly than in the absence of SMSCs incorporating the present invention because the SMSCs incorporating the invention will be sending less SMSs to it.

As the overload condition decreases, the serving MSC will send smsdpp return result messages containing increasingly smaller overload parameters. In response, the SMSCs incorporating the present invention can send increasingly larger percentages of their pending SMSs to the overloaded MSC until the serving MSC is no longer overloaded at all. Note that the MSC need not insert an overload parameter in every smsdpp return result. For instance, the network can be configured such that the SMSCs consider the overload parameters valid for a predetermined period of time (e.g., 1 minute) or consider them valid until superseded by a subsequent overload parameter from the same MSC. In yet another exemplary embodiment, the SMSC may consider the overload parameter valid for up to one minute unless superseded sooner by another overload parameter from the same MSC. For example, the MSCs can be configured to insert an overload parameter in a smsdpp return result every minute unless the amount of overload changes by more than a predetermined amount, in which case, it can send another overload parameter sooner. Alternately, MSCs can send an overload parameter only when the extent of overload changes by more than a predetermined amount, and the SMSCs consider an overload parameter to expire only upon receipt of a next overload parameter at the SMSC from the same MSC.

In one embodiment, the MSCs send overload parameters only when they are overloaded (in which cases, either the overload parameters should have a timed expiration or the MSC should at least send the SMSCs an indication when it drops out of overload condition—which indication could be an overload parameter indicating zero overload). Many other variations are possible and a suitable option should be selected by the network operator depending upon the operating conditions of the given network.

While, in this exemplary embodiment, the SMSC sends a number of SMSs to the overloaded MSC dictated by the overload parameter returned by the overloaded MSC and its present load of new SMSs, the SMSC can make its own decisions as to which SMSs to send to the overloaded MSC. Also, although the percentage of SMSs that an SMSC sends to the overloaded MSC is calculated in this example as a function of the number of new SMSs, this does not mean that the SMSC is sending only new SMS events to the overloaded MSC. The calculation is intended only to indicate the number of SMSs that are to be sent. The SMSC can send any combination of old SMSs (e.g., SMSs that were sent previously but were not acknowledged) and new SMSs. For instance, in one embodiment, the SMSC may send SMSs in order from its oldest messages first to newest messages last.

In any event, the SMSs that are not sent are queued for later delivery by the SMSC. This is unusual for an SMSC in that, depending on the protocol used to select which SMSs are sent and which are queued, the SMSC may be queuing new SMSs that have not yet been sent to the overloaded MSC for later transmission. Some SMSCs do queue new SMSs, but, in many conventional SMSCs, the only SMSs that are queued are old SMSs that have been previously attempted, but failed (e.g., an acknowledgement was not received).

With respect to both (1) which SMSs an SMSC sends and which SMSs it queues and (2) which SMSs an MSC decides to deliver versus discard when overloaded, another new parameter may be incorporated into SMSDPPs from an SMSC to a serving MSC, hereinafter termed a priority parameter. The new priority parameter may indicate a priority of the SMS, and may particularly include whether the SMS is an acknowledgement message (of another SMS). The priority information contained in the priority parameter may be generated by the SMSC or may be inserted in the meta-data of the SMS before it reaches the SMSC. For instance, it may be generated at the originating wireless communication unit 103-2, the originating MSC 107-2, or any other source of the SMS. When a serving MSC receives an SMSDPP with a priority parameter, if it is in overload, it looks at the priority parameter and discards the lower priority messages before it discards the higher priority messages. Further, this same priority parameter can be used by the SMSC itself to decide which messages to send and which messages to queue when it is sending messages to an overloaded serving MSC, as discussed above.

In one embodiment of the invention, acknowledgement SMSs can be given the highest priority or at least relatively high priority. These acknowledgement SMSs are receipt acknowledgements of other SMSs that are sent from the mobile node that received a particular original SMS back to the sender of that original SMS so that the user at the sending node can know that the original SMS was received and is distinct from smsdpp return results, which are signaling messages within the network strictly between MSCs and SMSCs. Such an embodiment has the advantage of helping to reduce the overload even faster because it will eliminate not only the need to re-send the discarded acknowledgement SMS, but also the need to re-send the original SMS (to which that acknowedgement is a response). Specifically, when the acknowledgement SMS is discarded, the user that sent the original SMS to which the acknowledgement SMS is a response will not know that the original SMS was properly delivered and, therefore, may keep trying to re-send the original SMS too.

The number of priority levels and the priority level assigned to different types of SMSs is in the discretion of the network operator.

Figure 2:
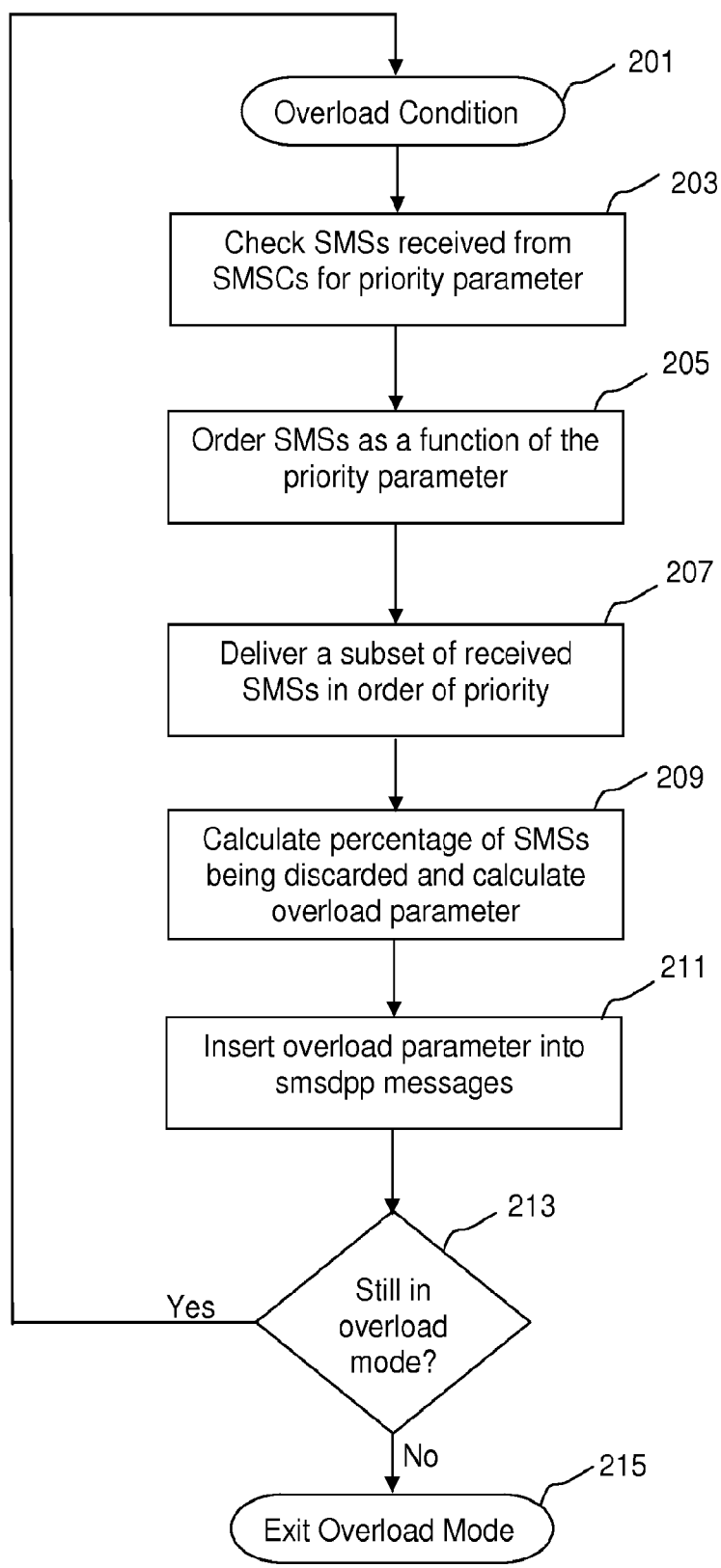
FIG. 2 is a flow diagram illustrating operation at a receiving node in accordance with the principles of the present invention.

FIG. 2 is a flow chart illustrating operation at a serving MSC in accordance with a particular exemplary embodiment of the present invention. In this example, the overload parameter is the aforementioned number of new SMSs*(1—overload percentage) and the SMSDPPs include a priority parameter. As shown in step 201, processing in accordance with this scheme is entered when the MSC enters an overload condition. In step 203, the MSC checks the priority parameters, if any, contained in the SMSDPPs it receives. In step 205, it places the SMSs from each SMSC in order as a function of those priority parameters.

Next, in step 207 the overloaded MSC starts delivering a subset of the SMSs received from each SMSC in order from higher priority SMSs to lower priority SMSs. In step 209, the MSC calculates the percentage of SMSs that are being discarded. Then, in step 211, the MSC starts sending to the SMSCs smsdpp return results that include an overload parameter, namely, the percentage of SMSs being discarded.

In step 213, the MSC determines whether it is still in overload condition. If so, flow returns to step 201 to remain in the overload mode. If not, flow instead proceeds to step 215 where it exits the overload mode of operation and returns to normal operation.

Figure 3:
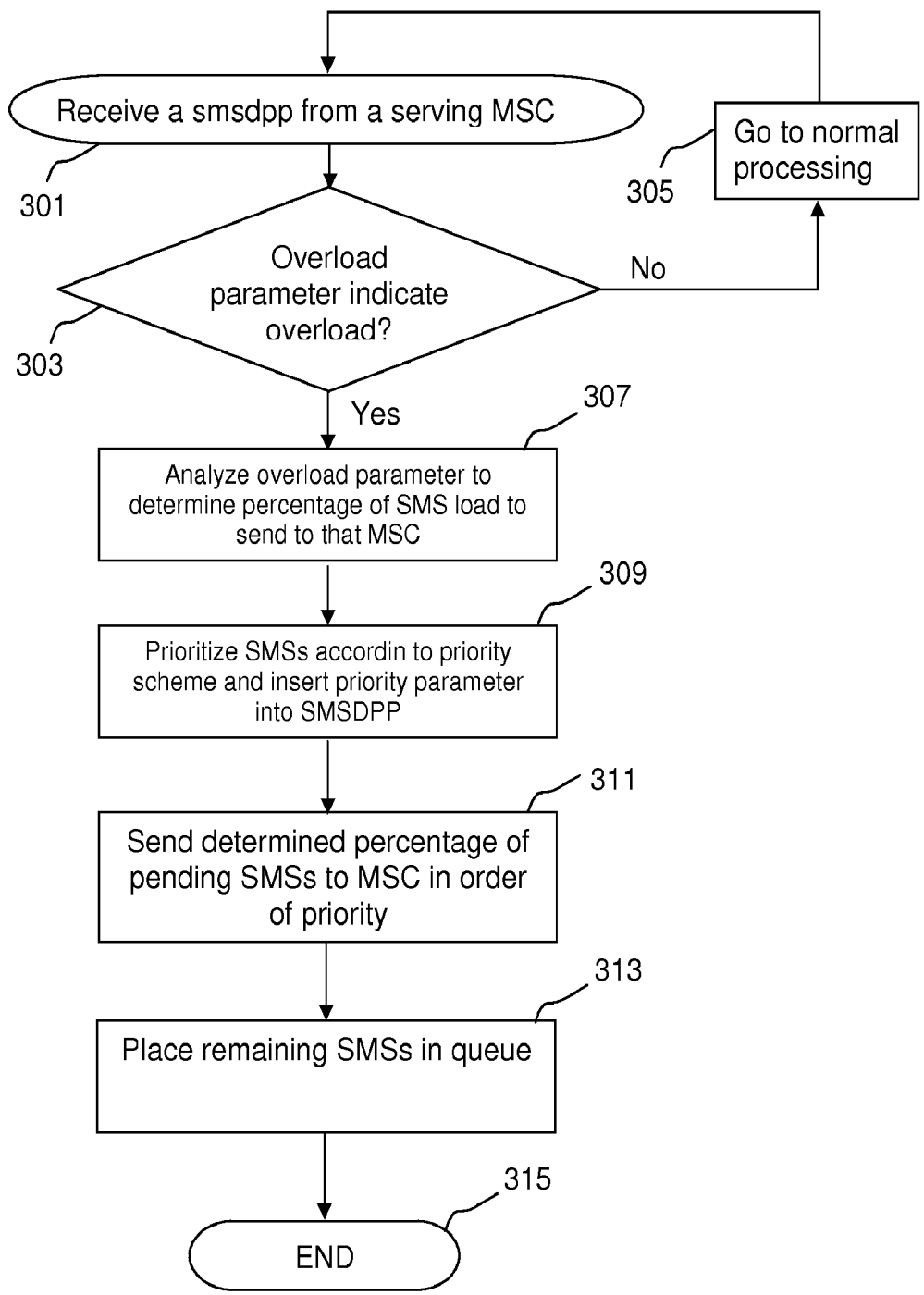
FIG. 3 is a flow diagram illustrating operation at a sending node in accordance with the principles of the present invention.

FIG. 3 is a flow chart illustrating the complementary operation at an SMSC in accordance with the same exemplary embodiment of the invention.

In step 301, the SMSC receives a smsdpp return result from a serving MSCs. In step 303, it determines if the smsdpp return result contains an overload parameter indicating that that particular MSC is overloaded. If not, flow proceeds to step 305 in which the SMSC operates according to conventional operation. However, if the MSC is overloaded, flow instead proceeds to step 307. In step 307, the SMSC analyzes the overload parameter to determine the rate at which it may send SMSs to that MSC, e.g., number of new events*(1—overload parameter).

Next, in step 307, it prioritizes its SMSs intended for that MSC according to a predetermined priority scheme, such as one of the schemes discussed hereinabove and inserts a priority parameter in its SMSDPPs directed to that MSC. (Of course, the SMSC may simply insert priority parameter in all SMSs it processes, regardless of whether the destination MSC is overloaded or even whether the MSC incorporates a priority parameter reading capability. If a MSC is not enabled to understand the priority parameter, then it will simply ignore it). In step 311, it sends the determined number of pending SMSs to that MSC in order of their priority. In step 313, the remaining SMSs that are not sent are placed in a queue in order of their priority parameter. The process ends at step 315 and will start again when another smsdpp return result is received from an MSC.

Figure 4:
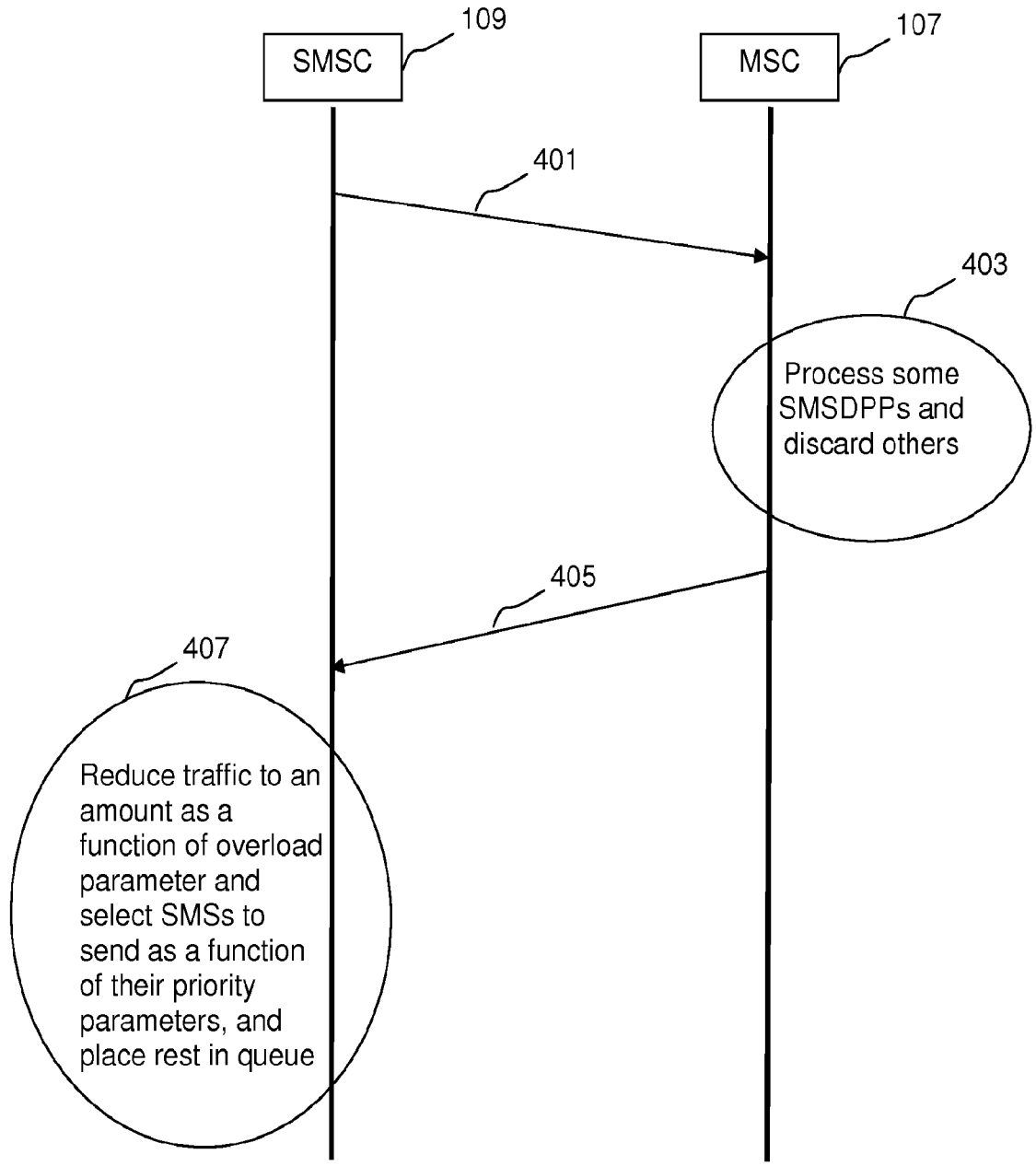
FIG. 4 is a signal flow diagram illustrating exemplary signal flow between various nodes of a network in accordance with an exemplary embodiment of the present invention.

FIG. 4 is a signal flow diagram illustrating signal flow between the SMSC 109 and the serving MSC 107 in accordance with the embodiment just described. First, the SMSC 109 sends a SMSDPP 401 to the serving MSC 107 including the priority parameter. If the MSC 107 is overloaded, it processes some portion of the messages and discards the rest, as illustrated at 403. The serving MSC 107 sends a smsdpp return result 405 to the SMSC 109 including an overload indicator disclosing that it is in overload condition and the extent of the overload. As illustrated at 407, in response, the SMSC reduces its future traffic by an amount that is a function of the overload parameter and decides which SMSs to send and which to place in queue as a function of their priority parameters.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A method of managing communication traffic in a communication network comprising at least a first node, a second node, and a plurality of third nodes, the method comprising:
   the first node sending a plurality of first messages to the second node, the plurality of first messages intended for delivery by the second node to a plurality of third nodes;
   if the second node cannot deliver all of the plurality of first messages due to being overloaded, wherein being overloaded comprises receipt of messages at a rate greater than it can process the messages, the first node receiving a second message from the second node, the second message containing an overload parameter, the overload parameter disclosing an amount by which the second node is overloaded, wherein the overload parameter is a percentage of messages received by the second node that the second node is unable to deliver;
   the first node parsing the second message to determine the overload parameter therein; and
   responsive to the second message, the first node adjusting the rate at which it sends messages to the second node to an amount that is a function of the overload parameter.

2. The method of claim 1 wherein the first node is a Short Message Service Center (SMSC) and the second node is a Mobile Switching Center (MSC) node.

3. The method of claim 2 wherein the third nodes are mobile communication units.

4. The method of claim 2 wherein the first messages are Short Message Service Delivery Point to Point invoke (SMSDPP) messages and the second messages containing the overload parameter are smsdpp return results.

5. The method of claim 1 wherein the overload parameter is a flow rate of messages.

6. The method of claim 1 wherein the first node reduces the rate at which it sends messages to the second node using a function of the percentage of messages received by the second node that the second node is unable to deliver.

7. The method of claim 1 wherein the first node reduces the rate at which it sends messages to the second node to a rate equal to the number of first messages it is processing for transmission to the second node that it has previously attempted to transmit to the second node multiplied by (one minus the overload parameter) over a predetermined time period.

8. The method of claim 1 further comprising:
   the first node incorporating into the first messages a priority parameter, the priority parameter disclosing a relative priority of the first message relative to other first messages;

the second node parsing the first messages to determine the priority parameters therein; and if the second node is overloaded such that it cannot deliver all of the first messages it is receiving, the second node selecting a subset of the first messages it receives for delivery, the second node selecting the subset of first messages for delivery as a function of the priority parameters associated with the first messages.

9. The method of claim 8 wherein the nodes of the third plurality of nodes send an acknowledgement message when they receive one of the plurality of first messages, wherein the acknowledgement messages contain a priority parameter, the value assigned to the priority parameter of the acknowledgement messages having a higher priority than messages that are not acknowledgement messages.

10. The method of claim 8 wherein some of the first messages comprise acknowledgements of other first messages and wherein first messages that are acknowledgement messages are assigned a priority parameter having a higher priority than first messages that are not acknowledgement messages.

11. A non-transitory computer readable medium storing computer instructions for operating a Message Switching Center (MSC) node when the MSC is receiving SMSs from at least one Short Message Service Center (SMSC) node for delivery by the MSC node to a plurality of subscriber nodes at a rate greater than the MSC node can deliver the SMSs, the computer instructions executable by a processor to perform:
  receiving short message service (SMS) messages; and
  responsive to the MSC being overloaded, wherein being overloaded comprises the MSC being unable to deliver all of said SMS messages received from the at least one SMSC, sending a smsdpp return result to the at least one SMSC comprising an overload parameter, the overload parameter disclosing an amount by which the MSC is overloaded, wherein the overload parameter is a percentage of messages received by the second node that the second node is unable to deliver, wherein the SMSC is configured to adjust its rate of sending the SMS messages to the MSC according to a function of the overload parameter.

12. The non-transitory computer readable medium of claim 11, wherein the computer instructions are further executable to perform:
  parsing the SMS messages to determine a priority parameters therein; and
  if the MSC is overloaded such that the MSC cannot deliver all of the SMS messages it is receiving, selecting a subset of the SMS messages received for delivery as a function of the priority parameters associated with the SMS messages.

13. A Mobile Switching Center (MSC) node for a network, comprising:
  communication hardware, configured to perform communication within the network; and
  processing hardware coupled to the communication hardware, wherein the processing hardware is configured to operate with the communication hardware to:
    receive short message service (SMS) messages from at least one Short Message Service Center (SMSC) node for delivery by the MSC node to a plurality of subscriber nodes; and
    responsive to being overloaded, wherein being overloaded comprises receiving SMS messages at a rate greater than a rate at which the MSC can deliver the SMS messages to the plurality of subscriber nodes, sending a message to the at least one SMSC containing an overload parameter, the overload parameter disclosing an amount by which the SMC is overloaded, wherein the overload parameter is a percentage of messages received by the second node that the second node is unable to deliver, wherein the SMSC is configured to adjust its rate of sending the SMS messages to the MSC according to a function of the overload parameter.

14. The MSC node of claim 13 wherein the SMSC node reduces the rate at which it sends messages to the second node using a function of the percentage of messages received by the second node that the second node is unable to deliver.

15. The MSC node of claim 13 wherein the processing hardware is further configured to:
  parse the SMS messages to determine priority parameters therein; and
  if the MSC is overloaded, deliver a subset of the received SMS messages to the plurality of subscriber nodes, the subset selected as a function of the priority parameters associated with the SMSs.

16. A Short Message Service Center (SMSC) node for a network, wherein the SMSC node comprises:
  communication hardware, configured to perform communication within the network; and
  processing hardware coupled to the communication hardware, wherein the processing hardware is configured to operate with the communication hardware to:
    transmit a plurality of short message service (SMS) messages to at least one Mobile Switching Center (MSC) node for delivery by the MSC node to a plurality of mobile nodes;
    receive return messages from the MSC responsive to the SMS messages, the return messages containing an overload parameter, the overload parameter disclosing an amount by which the MSC is overloaded, wherein being overloaded comprises receiving messages at a rate greater than a rate that the MSC node can process, wherein the overload parameter is a percentage of messages received by the second node that the second node is unable to deliver;
    parse the return message to determine the overload parameter; and
    adjust the rate at which the SMSC node sends SMSs to the MSC by an amount that is a function of the overload parameter.

17. The SMSC node of claim 16 wherein the SMSC node adjusts the rate at which it sends SMS messages to the MSC to an amount equal to a number of previously sent SMSs times (one minus the overload parameter) over a predetermined time period.

* * * * *